(12) United States Patent
Silva

(10) Patent No.: US 10,082,211 B2
(45) Date of Patent: Sep. 25, 2018

(54) INVERTED ELEMENT VALVE

(71) Applicant: BAKER HUGHES INCORPORATED, Houston, TX (US)

(72) Inventor: Zachary Silva, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/209,501

(22) Filed: Jul. 13, 2016

(65) Prior Publication Data
US 2018/0017174 A1    Jan. 18, 2018

(51) Int. Cl.
F16K 7/02    (2006.01)

(52) U.S. Cl.
CPC ..................... F16K 7/02 (2013.01)

(58) Field of Classification Search
USPC ........... 251/1.1, 1.2, 4, 5; 137/862; 277/324, 277/327
See application file for complete search history.

(56) References Cited

U.S. PATENT DOCUMENTS

| | | | | |
|---|---|---|---|---|
| 1,621,041 A * | 3/1927 | Trout | ........................ | F16J 15/54 251/1.1 |
| 1,869,345 A * | 7/1932 | Vallendor | ................ | E21B 33/06 251/1.1 |
| 2,148,844 A * | 2/1939 | Stone | ........................ | E21B 33/06 277/328 |
| 2,442,746 A * | 6/1948 | Anderson | .................. | F16K 7/02 138/45 |
| 3,292,718 A * | 12/1966 | Stone | ........................ | E21B 17/00 175/318 |
| 3,342,215 A * | 9/1967 | Griffin, III | ............ | E21B 21/106 138/45 |
| 3,685,786 A * | 8/1972 | Woodson | ........... | A61M 5/16877 138/45 |
| 3,854,694 A * | 12/1974 | Coone | .................... | F04B 7/0275 138/93 |
| 4,310,139 A * | 1/1982 | Williams, III | .......... | E21B 33/06 251/1.2 |
| 4,444,401 A * | 4/1984 | Roche | .................... | E21B 21/001 166/363 |
| 4,579,314 A * | 4/1986 | Schaeper | ................ | E21B 33/06 251/1.2 |
| 4,811,758 A * | 3/1989 | Piper | ...................... | E21B 21/106 137/844 |

(Continued)

*Primary Examiner* — Marina Tietjen
*Assistant Examiner* — Daphne M Barry
(74) *Attorney, Agent, or Firm* — Parsons Behle & Latimer

(57) ABSTRACT

A device and method for selectively closing and opening a flow path through a sealing element. The device includes second and third tubulars positioned within a bore of a first tubular. A sealing element having a bore is positioned between the second and third tubulars within the bore of the first tubular. The sealing element may be connected to one or both of the tubulars. Bores of the second and third tubulars communicate with the bore of the sealing element to provide a flow path. Movement of the third tubular with respect to the second tubular buckles the sealing element inward to selectively close a portion of the flow path. The third tubular may be moved away from the second tubular to reopen the flow path. The sealing element may engage a structure within the bore of the sealing element to selectively close the flow path through the sealing element.

11 Claims, 3 Drawing Sheets

(56) References Cited

U.S. PATENT DOCUMENTS

| | | | | |
|---|---|---|---|---|
| 5,529,278 A | * | 6/1996 | Weldon | A61M 5/16877 |
| | | | | 251/349 |
| 5,851,013 A | * | 12/1998 | Simons | E21B 33/06 |
| | | | | 251/1.2 |
| 6,053,191 A | * | 4/2000 | Hussey | F16K 7/075 |
| | | | | 137/15.18 |
| 8,960,306 B2 | * | 2/2015 | Smith | E21B 33/035 |
| | | | | 166/338 |

* cited by examiner

INVERTED ELEMENT VALVE

FIELD OF THE DISCLOSURE

The embodiments described herein relate to an inverted element valve and method of using the inverted element valve.

BACKGROUND

Description of the Related Art

Various valves and sealing mechanisms are known that may be used to selectively close a flow path. It is known to compress a sealing element to provide a seal, but generally the sealing element is expanded outward to seal a flow path between an exterior of a tubular and the interior of another tubular. While these mechanisms may be adequate to seal an external flow path such as an annulus, these sealing mechanisms may not be adequate if the flow path is an internal flow path, i.e., the flow path is within a tubular. Many progressive fracturing applications may require the use of a tubing string to pump fluid to a targeted formation, which may require diverting the fluid out of the tubing string through an external port.

Various valves may be currently used to selectively close an internal flow path and divert flow out an external port. Typically, a mechanical means is used to close the flow path. One example is landing a ball on a seat to close the flow path. However, the ball must then be milled out or floated back up the tubing string to reopen the flow path. A mechanical valve, such as a flapper valve, may also be used to selectively open or close a flow path. However, these types of valves generally include complex actuation mechanisms that may be fouled with debris or particulates found in the fluid flowing through the flow path.

It may be beneficial to use a simple downhole mechanism to close off a flow path and divert flow out of a tubular for various applications.

SUMMARY

The present disclosure is directed to an inverted element valve and method of use that overcomes some of the problems and disadvantages discussed above.

One embodiment is a device comprising a first tubular having an inner wall, an outer wall, and a bore with a second tubular and a third tubular positioned within the bore of the first tubular. The second tubular having an inner wall, an outer wall, and a bore and the third tubular having an inner wall, an outer wall, and a bore. The device comprising a sealing element having an expanded position and a compressed position, the sealing element having an inner wall, an outer wall, and a bore with the sealing element being positioned within the bore of the first tubular. The sealing element is positioned between the second and third tubulars. A first end of the sealing element may be connected to the second tubular and a second end of the sealing element may be connected to the third tubular. When the sealing element is in the expanded position, the bore of the second tubular, the sealing element, and the third tubular provide a flow path and when the sealing element is in the compressed position, the sealing element closes at least a portion of the bore of the sealing element.

Movement of the third tubular with respect to the second tubular within the bore of the first tubular may move the sealing element between the expanded position and the compressed positon. The second and third tubulars may be separated by a first distance when the sealing element is in the expanded position and may be separated by a second distance when the sealing element is in the compressed position, the second distance being shorter than the first distance. A portion of the outer wall of the second tubular may be connected to a portion of the inner wall of the first tubular to prevent movement of the second tubular with respect to the first tubular. The device may include a structure connected to the inner wall of the first tubular that prevents movement in at least one direction of the second tubular with respect to the first tubular.

The first tubular may include a port, wherein fluid flow is directed out of the port of the first tubular when the sealing element is in the compressed position. When the sealing element is in the compressed position, at least a portion of the inner wall of the sealing element may contact another portion of the inner wall of the sealing element to close a portion of the bore of the sealing element. When the sealing element is in the compressed position, at least a portion of the inner wall of the sealing element may contact a structure positioned within the bore of the sealing element to close a portion of the bore of the sealing element.

One embodiment may be a method to selectively close a flow path comprising providing a first tubular having a bore, providing a second tubular having a bore positioned within the bore of the first tubular, and providing a third tubular having a bore also positioned within the bore of the first tubular. The method comprises providing a sealing element having a bore positioned within the bore of the first tubular, wherein the sealing element is positioned between the second tubular and the third tubular. The sealing element may be connected between the second and third tubulars. The bore of the second tubular, the bore of the third tubular, and the bore of the sealing element forming a flow path. The flow path may be selectively closed and opening by movement of the third tubular with respect to the second tubular.

The method may include providing a port in the first tubular, wherein fluid flow is directed out the port of the first tubular when the flow path is closed. The method may include connecting at least a portion of the second tubular to the first tubular to prevent motion of the second tubular with respect to the first tubular. The method may include providing a structure that prevents motion of the second tubular with respect to the first tubular in at least one direction along the first tubular. The method may include providing a mandrel within at least a portion of bore of the sealing element, wherein the flow path may be selectively closed by engagement of the mandrel by at least a portion of the sealing element.

One embodiment is a method of selectively closing a flow path comprising moving a third tubular toward a second tubular, the second and third tubulars being positioned within a bore of a first tubular and buckling at least a portion of a sealing element inwards to selectively close a flow path through the sealing element, the sealing element being positioned between the second and third tubulars. The sealing element may be connected between the second and third tubulars. The sealing element may buckle against itself to selectively close the flow path through the sealing element. The method may include connecting a portion of the second tubular to the first tubular to prevent movement of the second tubular with respect to the first tubular. A structure within the bore of the first tubular may prevent movement of the second tubular with respect to the first tubular in at least one direction along the first tubular. The method may include moving the third tubular away from the second tubular to selectively open the flow path through the sealing element, the flow path being in communication with a bore of the second tubular and with a bore of the third tubular. Buckling the sealing element may further comprise engaging with a portion of the sealing element a mandrel that is positioned within at least a portion of the flow path through the sealing element to selectively close the flow path. The method may include flowing fluid out of a port in the first tubular after the flow path has been selectively closed.

Figure 1:
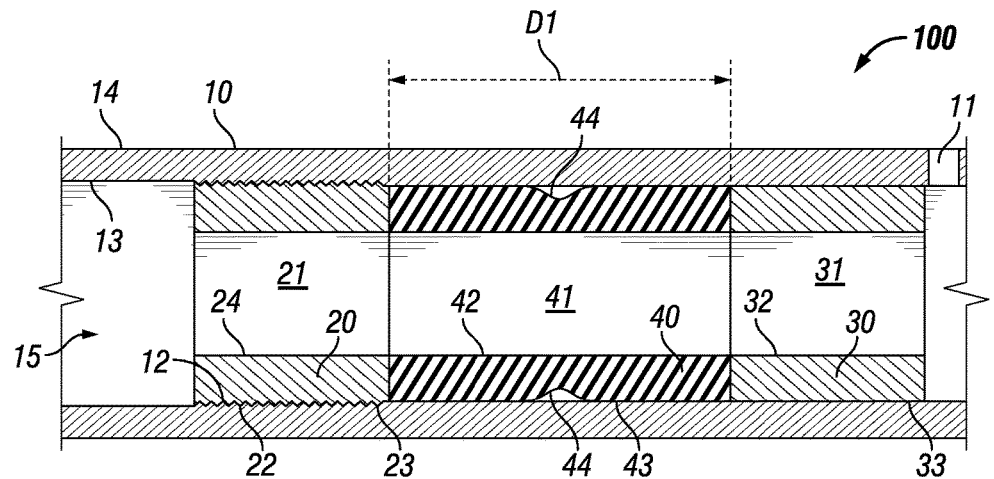
FIG. 1 shows an embodiment of an inverted element valve in an unset configuration.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows one embodiment of an inverted element valve 100. The valve 100 includes a first tubular 10 having a bore 15. The valve 100 includes a second tubular 20 and a third tubular 30 positioned within the bore 15 of the first tubular 10. A sealing element 40 is positioned between the second tubular 20 and the third tubular 30 within the bore 15 of the first tubular 10. In an embodiment, a first end of the sealing element 40 may be connected to the second tubular 20 and a second end of the sealing element 40 may be connected to the third tubular 30. In an initial or expanded configuration shown in FIG. 1, a bore 21 of the second tubular 20 is in communication with a bore 31 of the third tubular 30 and a bore 41 of the sealing element 40 to create a flow path that is in communication with the bore 15 of the first tubular 10.

The first tubular 10 includes an inner wall 13 and an outer wall 14. The first tubular 10 may include a port 11 through the wall of the first tubular 10 that provides communication between the bore 15 of the first tubular 10 and the exterior of the first tubular 10. The port 11 in the first tubular 10 may be a port that is configured to be selectively opened and closed as would be appreciated by one of ordinary skill in the art having the benefit of this disclosure. The port 11 is shown adjacent to the third tubular 30 for illustrative purposes only as the port 11 may be adjacent to the second tubular 20 or the first tubular 10 may include multiple ports 11 as would be appreciated by one of ordinary skill in the art having the benefit of this disclosure. The sealing element 40 may be actuated to close the flow path 41 through the sealing element 40 as discussed herein to divert fluid flow through a port 11 of the first tubular 10. Alternatively, the sealing element 40 may be actuated to close the flow path 41 and prevent fluid flow through the sealing element 40.

The second tubular 20 includes an inner wall 24 and an outer wall 23. A portion of the outer wall 23 of the second tubular 20 may be connected to a portion of the inner wall 13 of the first tubular 10 to prevent movement of the second tubular 20 with respect to the first tubular 10 along the bore 15 of the first tubular 10. Various mechanisms and/or structures may be used to connect the second tubular 20 to the first tubular 10 as would be appreciated by one of ordinary skill in the art having the benefit of this disclosure. For example, threads 12 on the inner wall 13 of the first tubular 10 may engage threads 22 on the outer wall 23 of the second tubular 20 to connect the second tubular 20 to the first tubular 10. The threads 22 on the outer wall 23 of the second tubular 20 may extend the entire length of the second tubular 20 as shown in FIG. 1 or may only extend along a portion of the outer wall 23 of the second tubular 20 as would be appreciated by one of ordinary skill in the art having the benefit of this disclosure.

The third tubular 30 includes an inner wall 32 and an outer wall 33. The outer wall 33 of the third tubular 30 may be configured to selectively slide along the inner wall 13 of the first tubular 10. As discussed herein, the sealing element 40 is positioned between the second tubular 20 and the third tubular 30 and may be connected to one or both of the second and third tubulars 20, 30. The bore 41 of the sealing element 40 creates a flow path through the sealing element 40 and is in communication with the bores 21, 31 of the second and third tubulars 20, 30 when the second tubular 20 and third tubular 30 are in an initial or expanded position as shown in FIG. 1. In the initial positon, the second and third tubulars 20, 30 may be separated from each other by a distance D1.

The sealing element 40 is positioned between the second tubular 20 and the third tubular 30 and includes a bore or flow path 41. The sealing element 40 includes an inner wall 42 and an outer wall 43 and may be comprised of various materials that will adequately seal the bore or flow path 41 as detailed herein as would be appreciated by one of ordinary skill in the art having the benefit of this disclosure. The sealing element 40 is configured to buckle or move inwards towards the bore or flow path 41 upon actuation as discussed herein. The sealing element 40 may include a feature 44, such as a cavity or depression, which promotes the buckling inwards of the sealing element 40 upon actuation.

Figure 2:
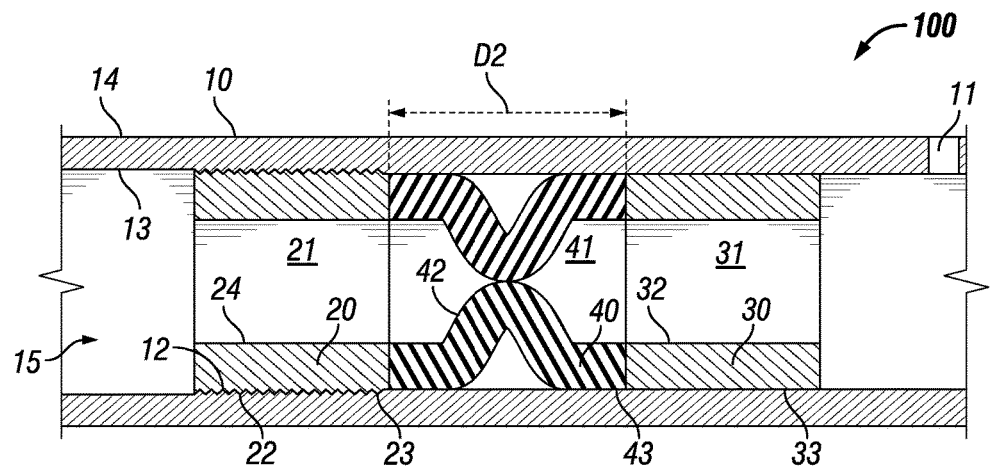
FIG. 2 shows the inverted element valve of FIG. 1 in a set configuration.

FIG. 2 shows the valve 100 with the sealing element 40 actuated to close the flow path 41 through the sealing element 40. To actuate the sealing element 40, the third tubular 30 has been moved towards the second sealing element 20 within the bore 15 of the first tubular 10. The movement of the third tubular 30 causes the sealing element 40 to buckle or collapse inwards until the inner wall 42 of the sealing element 40 closes at least a portion of the bore or flow path 41 through the sealing element 40. The sealing element 40 in the compressed position as shown in FIG. 2 prevents fluid flow past the sealing element 40. As discussed above, a portion of the outer wall 23 of the second tubular 20 may be connected to the inner wall 13 of the first tubular 10 to prevent movement of the second tubular 20 with respect to the first tubular 10 as the third tubular 30 is moved towards the second tubular 20. FIG. 2 shows that the second tubular 20 is separated from the third tubular 30 by a distance, D2. The distance D2 is less than the distance D1, shown in FIG. 1. The valve 100 provides a simple mechanical apparatus that may be used to selectively close a flow path within a tubular 10 without the need for a complex valve mechanism, such as a conventional flapper valve.

The selectively closing of the flow path 41 through the sealing element 40 may be used to divert the flow of fluid through an exterior port 11 in the first tubular 10. Alternatively, the valve 100 may be used to selectively prevent fluid flow past the sealing element 40 in the bore 15 of the first tubular 10 without diverting the fluid through another port. The flow path 41 may be selectively opened after closing by moving the third tubular 30 away from the second tubular 20 until the sealing element 40 expands outward to its initial configuration. The movement of the third tubular 30 towards and away from the second tubular 20 is for illustrative purposes as the second tubular 20 may be configured to move towards and away from the third tubular 30 to actuate the sealing element 40 as would be appreciated by one of ordinary skill in the art having the benefit of this disclosure. The valve 100 may be used with various types of tubulars to selectively control fluid flow through the tubulars as would be appreciated by one of ordinary skill in the art having the benefit of this disclosure.

Figure 3:
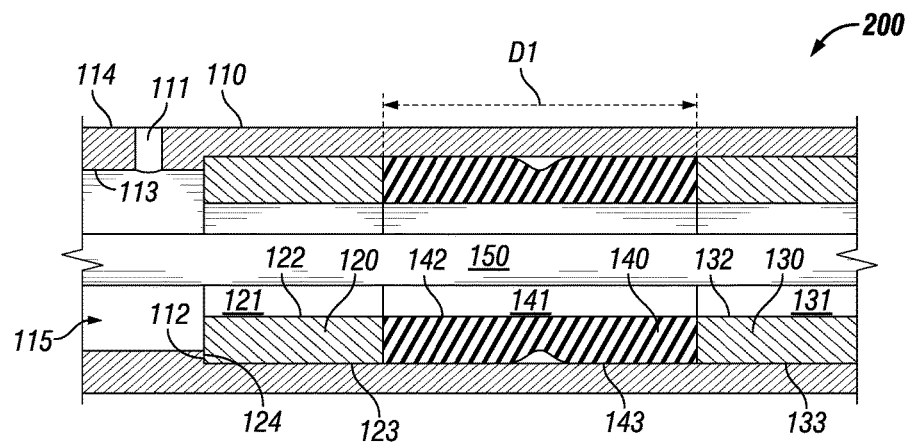
FIG. 3 shows an embodiment of an inverted element valve in an unset configuration.

FIG. 3 shows one embodiment of an inverted element valve 200. The valve 200 includes a first tubular 110 having a bore 115. The valve 200 includes a second tubular 120 and a third tubular 130 positioned within the bore 115 of the first tubular 110. A sealing element 140 is positioned between the second tubular 120 and the third tubular 130 within the bore 115 of the first tubular 110. As discussed above, the sealing element 140 may be connected to one or both of the second and third tubulars 120, 130. In an initial configuration shown in FIG. 3, a bore 121 of the second tubular 120 is in communication with a bore 131 of the third tubular 130 and a bore 141 of the sealing element 140 to create a flow path that is in communication with the bore 115 of the first tubular 110. The valve 200 includes a structure, such as a mandrel 150, located within at least a portion of the bore 141 of the sealing element 140. The mandrel 150 permits fluid flow through the bore 141 while the sealing element 140 is in an initial or expanded state as shown in FIG. 3. The mandrel 150 may be connected to the first tubular 110, the second tubular 120, and/or the third tubular 130 to position it within the bore 141 of the sealing element 140 as would be appreciated by one of ordinary skill in the art having the benefit of this disclosure.

The first tubular 110 includes an inner wall 113 and an outer wall 114. The first tubular 110 may include a port 111 through the wall of the first tubular 110 that provides communication between the bore 115 of the first tubular 110 and the exterior of the first tubular 110. The port 111 in the first tubular 110 may be a port that is configured to be selectively opened and closed as would be appreciated by one of ordinary skill in the art having the benefit of this disclosure. The port 111 in the first tubular 110 may be adjacent the second tubular 120 as shown in FIG. 3, adjacent the third tubular 130, or the first tubular 110 may include ports 111 on both sides of the valve 200. The sealing element 140 may be actuated to close the flow path 141 through the sealing element 140 as discussed herein to divert fluid flow through a port 111 of the first tubular 110. Alternatively, the sealing element 140 may be actuated to close the flow path 141 and prevent fluid flow through the sealing element 140.

The second tubular 120 includes an inner wall 122 and an outer wall 123. A portion of the outer wall 123 of the second tubular 120 may include a structure, such as a shoulder 124 that engages a corresponding structure 112 on the inner wall 113 of the first tubular 110 to prevent movement, in at least one direction, of the second tubular 120 with respect to the first tubular 110 along the bore 115 of the first tubular 110. Various mechanisms and/or structures may be used to prevent the movement of the second tubular 120 in one direction with respect to the first tubular 110 as would be appreciated by one of ordinary skill in the art having the benefit of this disclosure. For example, a projection and recess or corresponding mating profiles may be used to prevent movement of the second tubular 120 with respect to the first tubular 110 in at least one direction along the bore 115 of the first tubular 110.

The third tubular 130 includes an inner wall 132 and an outer wall 133. The outer wall 133 of the third tubular 130 may be configured to selectively slide along the inner wall 113 of the first tubular 110. As discussed herein, the sealing element 140 is between the second and third tubulars 120, 130 and may be connected to the second tubular 120 and/or the third tubular 130. The bore 141 of the sealing element 140 creates a flow path through the sealing element 140 and is in communication with the bores 121, 131 of the second and third tubulars 120, 130 when the second tubular 120 and third tubular 130 are in an initial or expanded position as shown in FIG. 3. In the initial positon, the second and third tubulars 120, 130 may be separated from each other by a distance D1.

Figure 4:
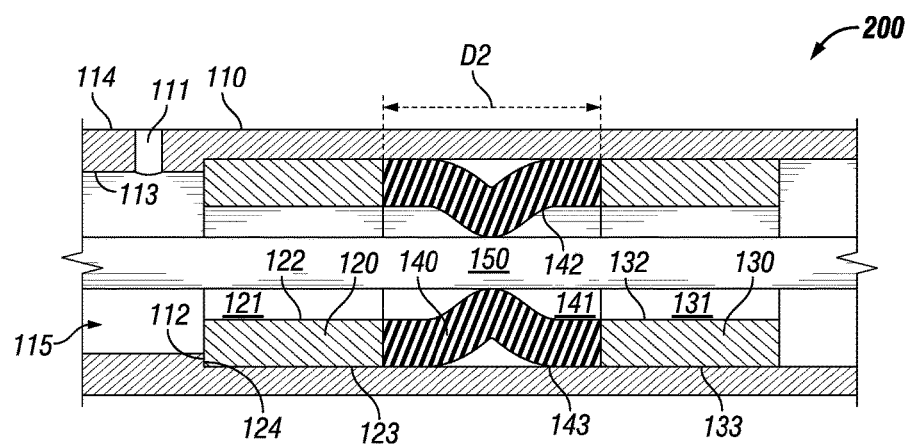
FIG. 4 shows the inverted element valve of FIG. 3 in a set configuration.

FIG. 4 shows the valve 200 with the sealing element 140 actuated to close the flow path 141 through the sealing element 140. To actuate the sealing element 140, the third tubular 130 has been moved towards the second sealing element 120 within the bore 115 of the first tubular 110. The movement of the third tubular 130 causes the sealing element 140 to buckle or collapse inwards until the inner wall 142 of the sealing element 140 engages the mandrel 150 and closes at least a portion of the bore or flow path 141 through the sealing element 140. The sealing element 140 in the compressed position as shown in FIG. 4 prevents fluid flow past the sealing element 140. As discussed above, a portion 124 of the outer wall 123 of the second tubular 120 may engage a feature 112 of the inner wall 113 of the first tubular 110 to prevent movement of the second tubular 120 with respect to the first tubular 110 as the third tubular 130 is moved towards the second tubular 120. FIG. 4 shows that the second tubular 120 is separated from the third tubular 130 by a distance, D2. The distance D2 is less than the distance D1, shown in FIG. 3. The valve 200 provides a simple mechanical apparatus that may be used to selectively close a flow path within a tubular 110 without the need for a complex valve mechanism, such as a conventional flapper valve.

The selectively closing of the flow path 141 through the sealing element 140 may be used to divert the flow of fluid through an exterior port 111 in the first tubular 110. Alternatively, the valve 200 may be used to selectively prevent fluid flow past the sealing element 140 in the bore 115 of the first tubular 110 without necessarily diverting the fluid through another port. The flow path 141 may be selectively opened after closing by moving the third tubular 130 away from the second tubular 120 until the sealing element 140 expands outward to its initial configuration. The movement of the third tubular 130 towards and away from the second tubular 120 is for illustrative purposes as the second tubular 120 may be configured to move towards and away from the third tubular 130 to actuate the sealing element 140 as would be appreciated by one of ordinary skill in the art having the benefit of this disclosure. The valve 200 may be used with various types of tubulars to selectively control fluid flow through the tubulars as would be appreciated by one of ordinary skill in the art having the benefit of this disclosure.

Figure 5:
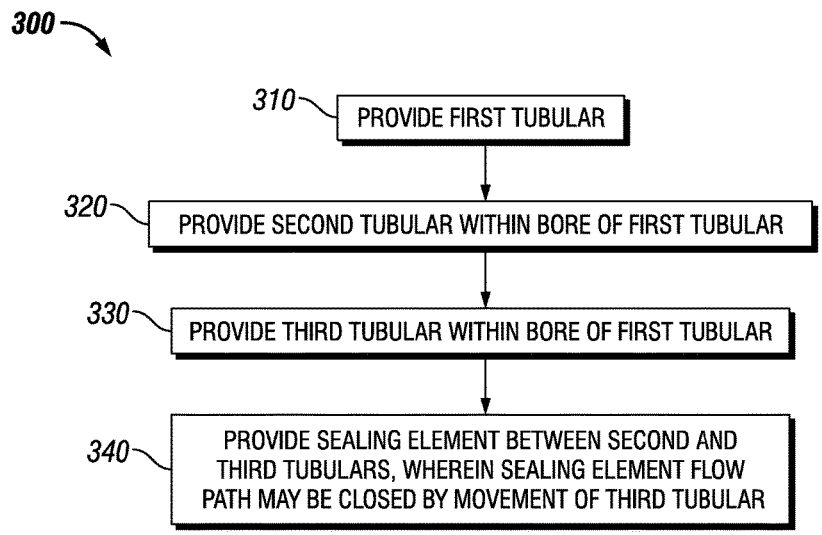
FIG. 5 shows a flow chart of one embodiment of method to seal an internal flow path.

FIG. 5 shows a flow chart of one embodiment of a method 300 of selectively closing a flow path. The method 300 includes step 310 of providing a first tubular. The first tubular includes a bore and may include an exterior port that permits communication between the bore and the exterior of the first tubular. The method 300 includes step 320 of providing a second tubular within the bore of the first tubular and the step 330 of providing a third tubular within the bore of the first tubular. In step 340, a sealing element is provided between the second and third tubulars. The sealing element may be connected to second tubular, the third tubular, or both the second and third tubulars. The first and second tubulars include bores that form a flow path with the bore or flow path through the sealing element. The sealing element flow path may be closed by movement of the third tubular towards the second tubular. Alternatively, the sealing element flow path may be closed by movement of the second tubular towards the third tubular as discussed herein. The movement of the second and third tubulars with respect towards each other causes the sealing the sealing element to collapse or buckle inwards closing the flow path or bore through the sealing element. In one embodiment, the sealing element may collapse or buckle onto a structure located within the bore of the sealing element.

Figure 6:
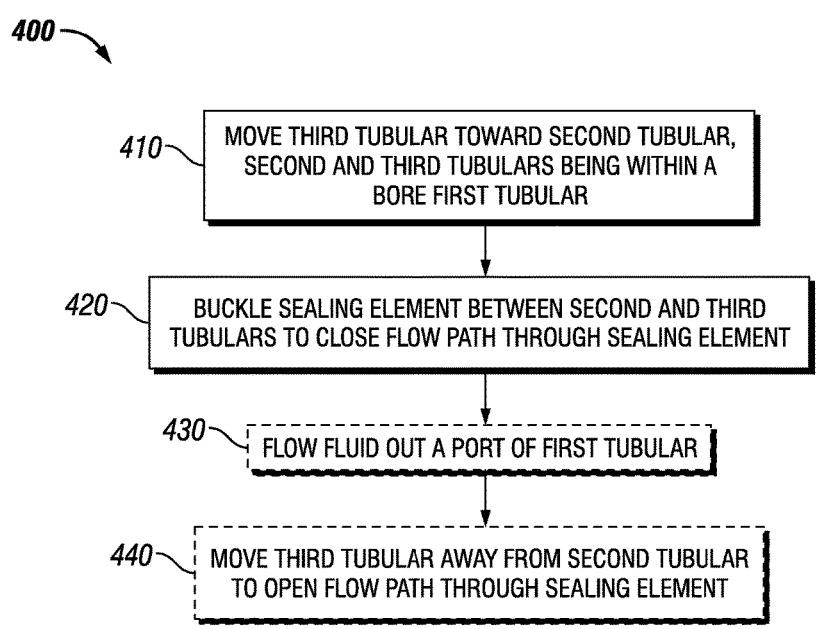
FIG. 6 shows a flow chart of one embodiment of method to seal an internal flow path.

FIG. 6 shows a flow chart of one embodiment of a method 400 of selectively closing a flow path. The method 400 includes step 410 of moving a third tubular towards a second tubular, the second and third tubulars being positioned within a bore of a first tubular. The first tubular may include an exterior port that permits communication between the bore and the exterior of the first tubular. The method 400 includes step 420 of buckling the sealing element positioned between the second and third tubulars to close a flow path through the sealing element. The sealing element may be connected to one or both of the second and third tubulars. The method 400 may include an optional step 430 of flowing fluid out of a port in the first tubular while the flow path through the sealing element is closed. The method 400 may also include an optional step 440 of moving the third tubular away from the second tubular to reopen the flow path through the sealing element. As discussed herein, the flow path of the sealing element may be closed by movement of the second tubular towards the third tubular or by movement of the third tubular towards the second tubular. The movement of the second and third tubulars with respect towards each causes the sealing the sealing element to collapse or buckle inwards closing the flow path or bore through the sealing element. In one embodiment, the sealing element may collapse or buckle onto a structure located within the bore of the sealing element.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A device comprising:
   a first tubular having an inner wall, an outer wall, a first end, a second end, and a bore;
   a second tubular having an inner wall, an outer wall, and a bore, the second tubular being positioned between the first and second ends of the first tubular and within the bore of the first tubular;
   a third tubular having an inner wall, an outer wall, and a bore, the third tubular being positioned entirely between the first and second ends of the first tubular and within the bore of the first tubular;
   a sealing element having an expanded position and a compressed position, the sealing element having an inner wall, an outer wall, and a bore and being positioned within the bore of the first tubular, the sealing element being positioned between the second tubular and the third tubular,
   wherein when the sealing element is in the expanded position, the bores of the second tubular, the sealing element, and the third tubular provide a flow path,
   wherein when the sealing element is in the compressed position, the sealing element closes at least a portion of the bore of the sealing element,
   wherein movement of the third tubular with respect to the second tubular within the bore of the first tubular moves the sealing element between the expanded position and the compressed position,
   wherein the second tubular and the third tubular are separated by a first distance when the sealing element is in the expanded positioned and are separated by a second distance when the sealing element is in the compressed positioned, the second distance being shorter than the first distance, and
   wherein the first tubular comprises a port, wherein fluid flow is directed through the port of the first tubular from a portion of the flow path when the sealing element is in the compressed position.

2. The device of claim 1, wherein at least a portion of the outer wall of the second tubular is connected to a portion of the inner wall of the first tubular to prevent movement of the second tubular with respect to the first tubular.

3. The device of claim 1, further comprising a structure connected to the inner wall of the first tubular that prevents movement in a least one direction of the second tubular with respect to first tubular.

4. The device of claim 1, wherein when the sealing element is in the compressed position at least a portion of the inner wall contacts another portion of the inner wall to close the portion of the bore of the sealing element.

5. The device of claim 1, wherein when the sealing element is in the compressed position at least a portion of the inner wall contacts a structure positioned within the bore of the sealing element to close the portion of the bore of the sealing element.

6. A method of selectively closing a flow path comprising:
   providing a first tubular having a bore;
   providing a second tubular having a bore, the second tubular being positioned entirely within the bore of the first tubular;
   providing a third tubular having a bore, the third tubular being positioned entirely within the bore of the first tubular;
   providing a sealing element having a bore, the sealing element being positioned entirely within the bore of the first tubular, wherein the sealing element is positioned between the second tubular and the third tubular and wherein the bore of the second tubular, the bore of the third tubular, and the bore of the sealing element form a flow path; and wherein the flow path may be selectively closed and opened by movement of the third tubular with respect to the second tubular, wherein the movement of the third tubular comprises an outer wall of the third tubular sliding along an inner wall of the first tubular; and providing a port in the first tubular, wherein fluid flow is directed through the port of the first tubular when the flow path is closed.

7. The method of claim 6, further comprising connecting at least a portion of the second tubular to the first tubular to prevent motion of the second tubular with respect to the first tubular.

8. The method of claim 6, further comprising providing a structure that prevents motion of the second tubular with respect to the first tubular in at least one direction along the first tubular.

9. The method of claim 6, further comprising providing a mandrel within at least a portion of the bore of the sealing element, wherein the flow path may be selectively closed by engagement of the mandrel by at least a portion of the sealing element.

10. A device comprising:
a first tubular having a wall, a bore, and at least one port in the wall, the at least one port being in communication with the bore of the first tubular and an exterior of the first tubular;
a second tubular having an inner wall, an outer wall, and a bore, the second tubular being positioned within the bore of the first tubular;
a third tubular having an inner wall, an outer wall, and a bore, the third tubular being positioned within the bore of the first tubular;
a sealing element having an expanded position and a compressed position, the sealing element having an inner wall, an outer wall, and a bore and being positioned within the bore of the first tubular, a sealing element being positioned between the second tubular and the third tubular, wherein when the sealing element is in the expanded position, the bores of the second tubular, the sealing element, and the third tubular provide a flow path
wherein the third tubular further comprising a first end and a second end, wherein both the first and second ends of the third tubular are positioned between the sealing element and the port when the sealing element is in the expanded position,
wherein when the sealing element is in the compressed position, the sealing element closes at least a portion of the bore of the sealing element and wherein the port provides communication between the exterior of the first tubular and a portion of the flow path, and
wherein movement of the third tubular with respect to the second tubular within the bore of the first tubular moves the sealing element between the expanded position and the compressed position.

11. The device of claim 10, wherein the port is adjacent to the third tubular.

* * * * *